Sept. 29, 1970     F. M. LATHROP II     3,530,705
METER PROVING SYSTEM WITH LEAK DETECTION
Filed June 10, 1968     3 Sheets-Sheet 3
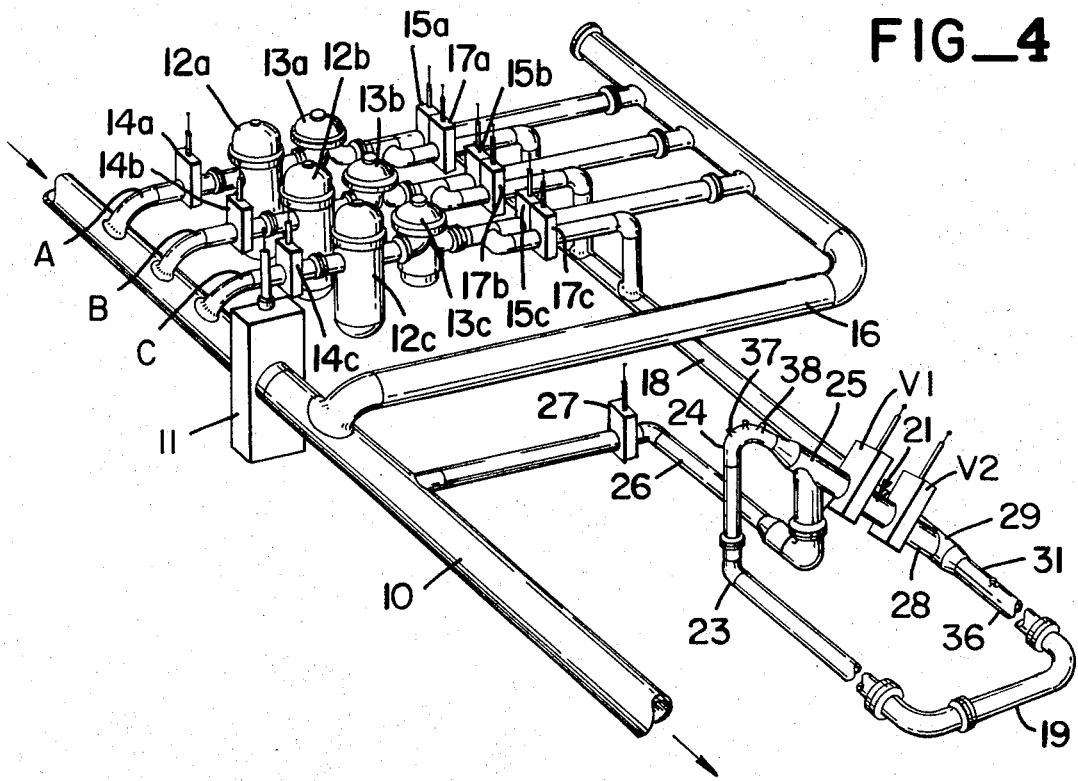
FIG_4
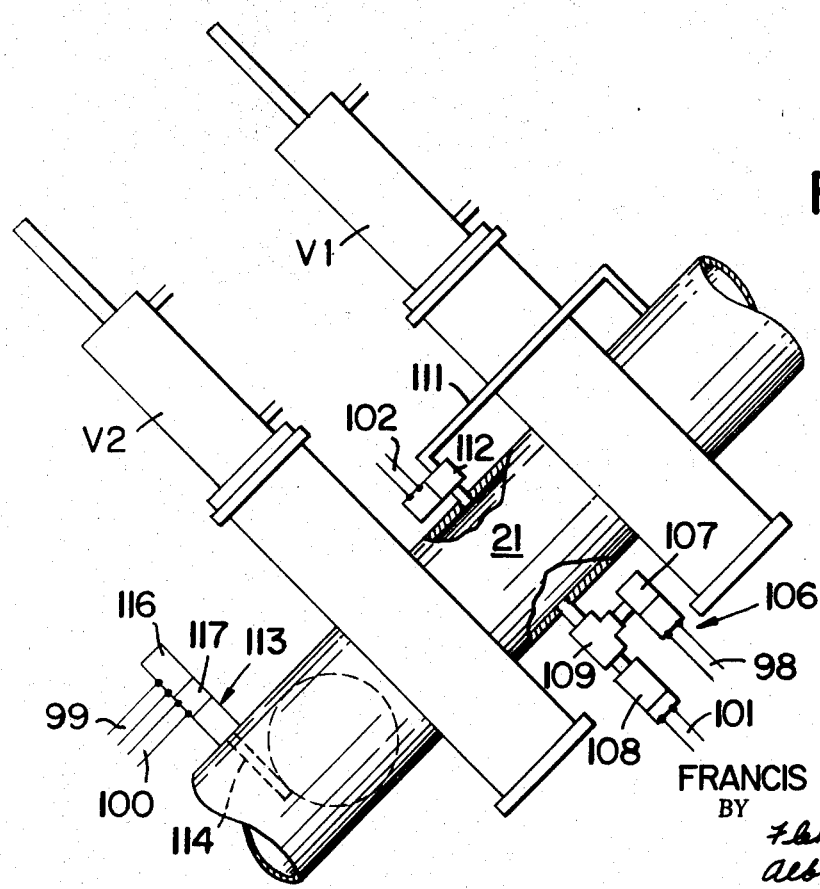
FIG_2
INVENTOR.
FRANCIS M. LATHROP, II
BY
ATTORNEYS

United States Patent Office 3,530,705
Patented Sept. 29, 1970

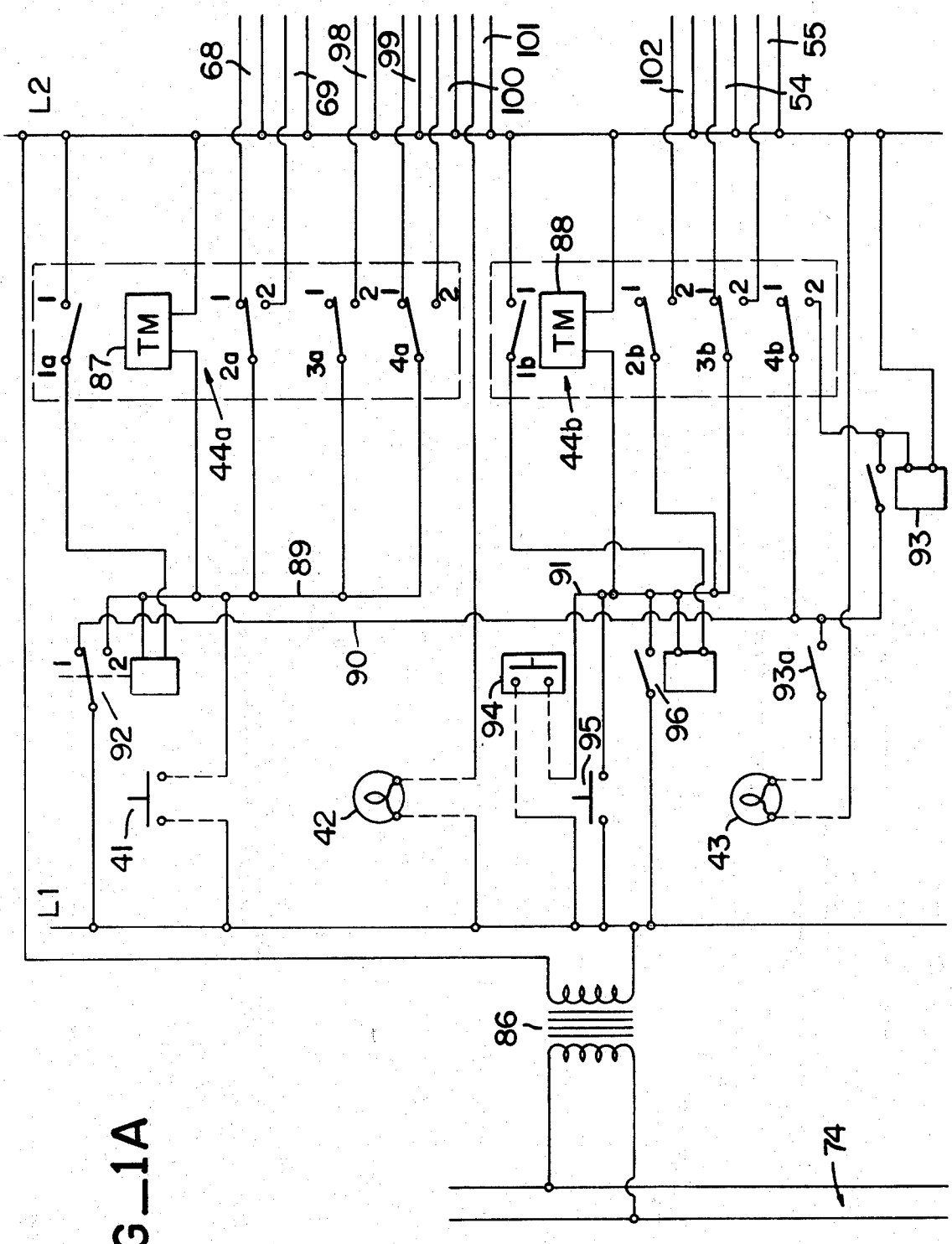

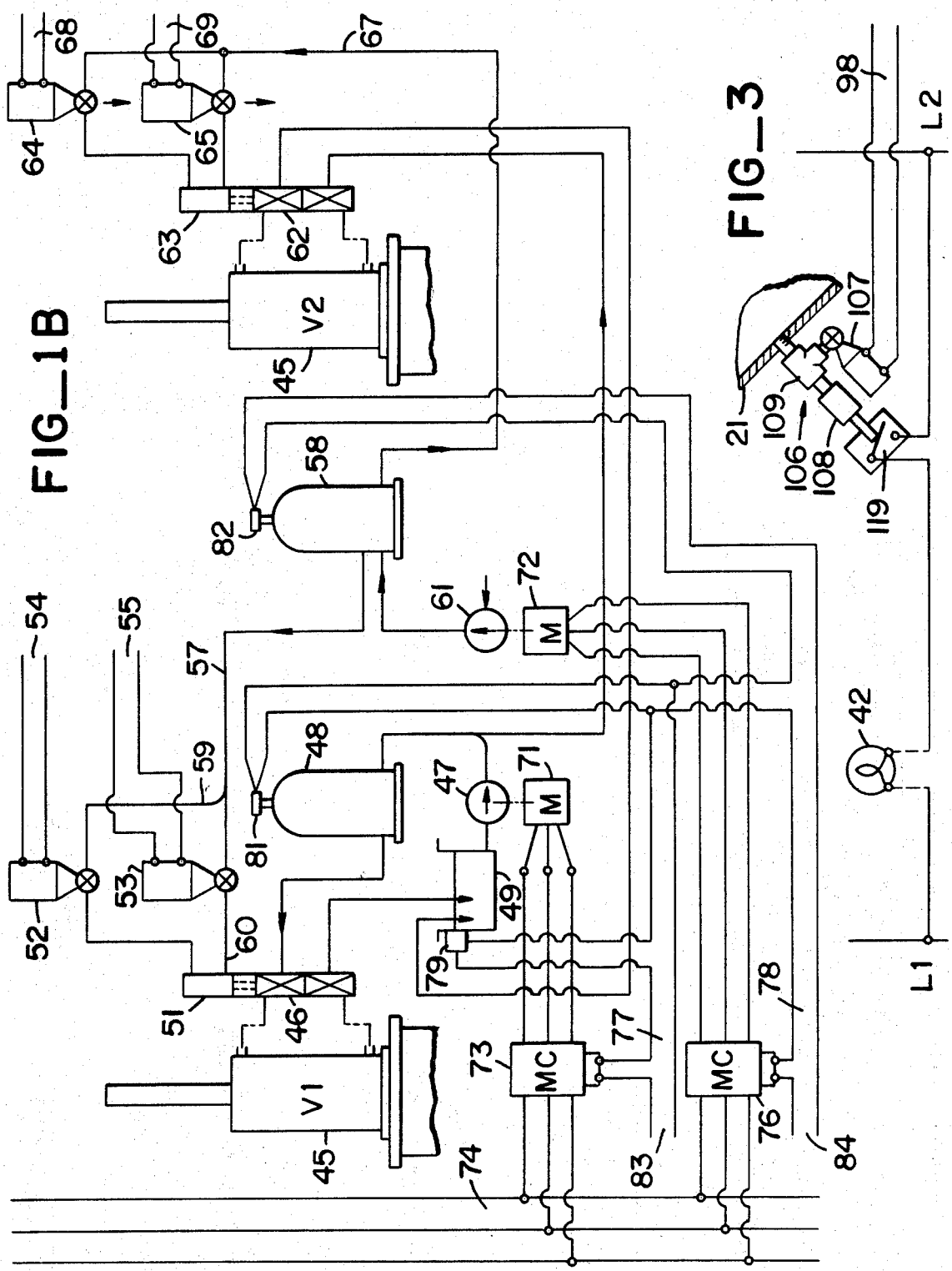

3,530,705
METER PROVING SYSTEM WITH LEAK DETECTION
Francis M. Lathrop II, Houston, Tex., assignor to M & J Valve Company, Houston, Tex., a corporation of Delaware
Filed June 10, 1968, Ser. No. 735,622
Int. Cl. G01f 25/00
U.S. Cl. 73—3                                                          4 Claims

ABSTRACT OF THE DISCLOSURE

Meter proving apparatus of the type using a metering pipe which receives a flow propelled sphere and a valve controlled sphere return passage connecting the inlet and discharge ends of the metering pipe. Leak detecting means is incorporated with the apparatus so that if valve leakage occurs, such as would interfere with metering accuracy, it is immediately detected.

BACKGROUND OF THE INVENTION

In piping systems for conveying or handling various liquids such as petroleum products, it is important to provide accurate flow metering means. The more conventional flow metering devices such as meters of the positive displacement and turbine types are subject to serious inaccuracies that may be cumulative. Of recent years so-called meter provers have been employed which makes accurate periodic checks of the flow for calibration of the flow meter. One form of meter prover which has been developed employs an extended length of metering pipe of uniform internal diameter which is connected to the main piping system. An interchange connects between the inlet and discharge ends of the metering pipe and is valve controlled to enable a sphere or plug to be launched from the interchange into the inlet end of the metering pipe, and to be returned to the interchange after it reaches the discharge end. By means of an associated electrical system which is activated when the sphere passes through detecting points located near the inlet and discharge ends, a flow meter reading is obtained for the time interval required for the travel of the sphere between the detecting point. This reading is then compared with the known volume of the metering pipe between the detecting points to provide accurate calibration data.

The interchange commonly consists of a valve controlled piping connected at its ends to the inlet and discharge ends of the metering pipe, whereby a sphere launched in the interchange progresses into the inlet end of the metering pipe. Also it is common practice to employ flow diverting means whereby the flow of liquid is diverted to the main flow line, while the sphere is delivered to the interchange. As disclosed in Van Arsdale application Ser. No. 506,549, filed Nov. 5, 1965, now Pat. No. 3,387,483 and entitled "Flow Meter Proving Apparatus", beneficial results can be obtained by employing an interchange which is disposed at an inclination of, say, 45° to the horizontal, with the valves being likewise inclined.

One difficulty with prior meter prover systems is that the cycle is not completely automatic. There is need for a system which one can initiate by operation of a single control member, with all of the functions thereafter being carried out automatically. Another difficulty with prior systems is that leakage of the interchange valving may result in serious inaccuracies. There is need for a system which, before the cycle of operation is commenced, will certify to the operator that no leakage is occurring.

SUMMARY OF THE INVENTION AND OBJECTS

This invention pertains generally to meter proving method systems such as are employed in conjunction with pipelines for the transmission or handling of liquids.

In general it is an object of the invention to provide a meter proving method and system which is automatic in its operation, and which will carry out all of its essential functions without manual intervention.

Another object of the invention is to provide a meter proving method and system which will certify to the operator that the interchange valving is not leaking, before the commencement of a meter proving cycle.

Another object of the invention is to provide a system of the above character which utilizes power means for operating the valves of the interchange, in conjunction with electrical circuitry and timing means for controlling the various operations of a complete cycle.

Additional objects and features of the invention will appear from the following description in which the preferred embodiment has been set forth in detail.

BRIEF DESCRIPTION OF THE DRAWINGS

FIGS. 1A and 1B, taken together, form a schematic diagram illustrating various operating parts and circuitry connections;

FIG. 2 illustrates the two valves of the interchange together with leak detecting and bypass means;

FIG. 3 schematically illustrates the leakage detecting means used to certify as to absence of leakage;

FIG. 4 is a schematic perspective view of equipment forming a complete certification system, including the pipe forming a metering loop.

DESCRIPTION OF THE PREFERRED EMBODIMENTS

Referring to FIG. 4, there is shown an arrangement of piping and valves connected with the main liquid flow line 10, and which can be used for conventional metering or for checking the accuracy of any one of the meters. The main line 10 is provided with a shut-off valve 11, and on the upstream side of this valve pipe 10 connects with a plurality of pipelines A, B and C which serve to divert liquid through the filters 12a, 12b and 12c, and the meters 13a, 13b and 13c of the positive displacement or turbine types. Any one of the lines A, B and C can be shut off by the valves 14a, 14b and 14c. Also flow from the downstream side of any one of the meters can be sent through any one of the valves 15a, 15b and 15c to pipe 16 and thence to the downstream side of valve 11, or by closing valves 15a 15b and 15c, and opening valves 17a, 17b and 17c, flow can be diverted to the pipe 18 leading to the metering pipe. The meter prover includes the metering pipe 19, which may be in the form of a loop, together with an interchange 21 which connects the inlet and discharge ends of the pipe 19. The interchange includes the two valves V1 and V2 which are adapted to be power operated as by hydraulic means, the valves being interconnected by T21 or like means forming a cavity capable of accommodating a sphere. The discharge end 23 of the metering loop is connected to the upstream side of valve V1 by the pipe bend 24 and the flow diverter 25. The flow diverter serves to divert liquid flow back to the downstream side of line 10 through pipe 26 and valve 27. A short pipe 28 connects the lower or downstream side of valve V2 to a T29 which in turn connects with pipe 18 and with the inlet end 31 of the metering loop.

When the meter prover portion of the system is not in use, flow is diverted through any one or more of the pipes A, B or C, with the valve 11 closed. The readings of the flow meters will therefore give the amount of liquid flow, except for possible inaccuracies. When it is desired to check a particular meter, at least one of the valves 14a, 14b or 14c (e.g., 14a) is opened whereby liquid is supplied through the meters to be checked. Line flow may continue through one or more of the other meters. Also the corresponding valve 15a is closed and valve 17a is opened whereby liquid is caused to flow through pipe 18 and through the meter loop back to the line 10 through pipe 26 and valve 27. Preferably the rate of flow through meter 14a is adjusted to be near normal. This can be done by throttling flow through valve 17a if the meter flow rate is too high, or by throttling down on valves 15b and 15c if the flow rate through meter 14a is too low.

The pipe constituting the metering loop 19 is of fixed internal diameter slightly smaller than the diameter of the sphere. However, the diameter of the piping associated with the interchange 21 through which the sphere passes when it is being transferred from the discharge to the inlet end of the loop is substantially larger in internal diameter whereby the sphere moves freely without restriction. The same is true of the flow passages through the valves V1 and V2. These valves are provided with sealing means capable of producing shut-off without leakage. Particularly the sealing means may be constructed as disclosed in Pat. 3,269,695. Also these valves may be of the short gate type rather than of the through-port type. All of the other gate valves of the system may be of substantially the same construction, although it is desirable for valve 11 to be of the through-port type.

The interchange 21 is shown disposed at an angle of 45°, and the valves V1 and V2 are likewise inclined. Such an arrangement is disclosed and claimed in the aforesaid copending application S.N. 506,549. The sphere detecting devices 36 and 37 are located at the inlet and discharge ends of the loop 19 for the purpose of detecting the passage of the sphere and for gating the counter of the meter accordingly. Such devices are well known and may consist of a sensing member which is engaged by the sphere and which serves to operate electrical contacts. An additional sphere detecting device 38 located at the discharge end of the loop serves to initiate certain operations of the metering cycle, as will be presently explained.

Referring to the diagrammatic layout and circuitry of FIGS. 1A and 1B taken together, the two valves V1 and V2 have been schematically indicated, together with associated parts for controlled hydraulic operation. The parts of the electrical circuitry include the start switch 41, which is operated directly or from a remote point, together with the indicator lamps 42 and 43, or like indicating devices. Lamp 42 is referred to as the certification lamp because illumination of this lamp indicates a leakage in the interchange valving before starting a proving run. Lamp 43 can be referred to as the ready lamp because it indicates the completion of a run. Two timing means 44a and 44b are schematically indicated. Timing means 44a and its switch contacts control all of the functions of the cycle ending before the sphere reaches the detector 38, while the timing means 44b with its switch contacts controls the subsequent functions ending with termination of the cycle.

The hydraulic operators 45 for the valves V1 and V2 may be operators of the double acting cylinder-piston type. Supply of liquid under pressure to one end of each cylinder and exhaust of liquid from the other end is controlled by a four-way valve which in turn is supplied with liquid under pressure. Although the four-way valves may be directly operated to effect opening and closing of the valve, as by solenoids, it is deemed preferable to utilize a pneumatic operator for this purpose, with solenoid valves being used to control application of air under pressure. Thus with respect of valve V1, there is a four-way control valve 46 having hydraulic pipe connections to the ends of the hydraulic operator 45. A motor driven hydraulic pump 47 supplies liquid to the accumulator 48 and maintains a pressure within this accumulator for use independently of operation of the pump. The accumulator in turn has a pipe connection to the four-way valve 46 and the four-way valve has another pipe connection for exhausting liquid to the reservoir 49. The four-way valve 46 has its operating member connected to the double acting pneumatic operator 51 which may be of the cylinder-piston type. Air supplied to the operator 51 is controlled by the solenoid valves 52 and 53, which are actuated by energizing their respective circuits 54 and 55. An air pressure line 57 leads from the air pressure accumulator and connects with the branch air lines 59 and 60 leading to the pneumatic operator 51, through the solenoid valves 52 and 53. Solenoid 52 can be referred to as the closing solenoid, because when it is energized it causes air under pressure to be applied to the operator 51 in such a manner that the four-way valve 46 is conditioned to supply liquid under pressure to that end of the operator 45 which causes the associated valve to be closed. Similarly when solenoid 53 is energized, it causes liquid to be supplied to the hydraulic operator 45 to open the valve. When a solenoid valve is de-energized, it vents to the atmosphere as indicated. Proper air pressure is maintained in the accumulator 58 by the compressor 61.

The arrangement for valve V2 is similar to that for valve V1. Here again the hydraulic connections to the operator 45 extend to the four-way valve 62 which is operated by the pneumatic operator 63. Solenoid valves 64 and 65 control supply of air to the pneumatic operator 63 from the air line 67, which may connect with the common accumulator 58. The energizing of circuits 68 and 69 serves to actuate one or the other of the solenoid valves 64 and 65 to effect closing or opening of the valve V2.

Electrical motors 71 and 72 are shown for driving pump 47 and compressor 61. It will be appreciated that the electrical arrangement for supplying current to the motors 71 and 72 may vary in different instances. With the arrangement illustrated, three-phase motors are employed, with the motor 71 being connected through the motor controller 73 to the three-phase supply lines 74. Motor 72 is similarly shown connected to the three-phase supply lines through the motor controller 76. Aside from the usual overload cut-off characteristics of the controllers 73 and 76, they may be provided with supplemental control circuits 77 and 78. Circuit 77 serially includes contacts of a liquid level controller 79 in the reservoir 49, and contacts of a pressure sensitive device 81 for maintaining the desired hydraulic pressure level in accumulator 48. The control circuit 78 for the motor controller 76 likewise includes serially the contacts of the pressure sensitive device 81 and the contacts of a pressure sensitive device 82 which is installed on the air pressure accumulator 58. The open terminals 83 and 84 of the two circuits 77 and 78 are connected across a suitable current supply, such as a transformer 86 as will be presently described.

With the type of control illustrated for motors 71 and 72, the pump 47 is intermittently operated to maintain a desired hydraulic pressure level in the accumulator 48. The pump is shut down in the event there is insufficient oil in the reservoir 49. The compressor 61 is operated intermittently to maintain a desired air pressure level in the accumulator 58.

The circuitry illustrated in FIG. 1A includes a suitable current supply, such as the single phase transformer 86 which has its primary terminals connected to two lines of the three-phase current supply 74. The low voltage secondary terminals are connected to supply current to the terminals 83 and 84 of the circuits 77 and 78, and in addition they connect to the low voltage lines L1 and L2.

The timing means 44a and 44b are each of the type provided with a timing motor, with the motor driving switch operating cams through a clutch, and with the cams in turn effecting operation of certain switch contacts in a desired sequence and with a desired interval of time between sequential operations. Such timing means are well known and need not be described in detail. Referring to the timing means 44a, it includes a timing motor 87 and cam operated switches 1a, 2a, 3a and 4a. Timing means 44b similarly consists of a timing motor 88 together with cam operated switches 1b, 2b, 3b and 4b. One side of the motor 87 and also the blades of the switches 2a, 3a and 4a are connected to a common conductor 89. Likewise one side of the motor 88 and the blades of switches 2b and 3b are connected to the common conductor 91, and the blade of switch 4b is connected to conductor 90. The contacts of the start switch 41 are connected directly between the conductor 89 and line L1. A holding circuit is provided for switch 41, which includes the relay 92. The blade of this relay connects with line L1 and its contact 2 connects to conductor 89. Contact 1 of relay 92 is connected by conductor 90 with the blade of relay 93. The single contact of relay 93 connects to contact 2 of cam switch 4b and to one side of the relay winding. The other side of the relay winding connects to line L2. Relay 93 has a second set of contacts 93a which are in series with lamp 43.

The switch 94 represents the contacts of the sphere detector 38. It is connected between lines L1 and conductor 91. Another switch 95, which can be referred to as a bypass controlling switch, is shunted across switch 94. A holding arrangement is provided by relay 96 which has its blades connected to line L1 and its single contact connected to conductor 91. The winding of this relay has its one side connected to conductor 91 and its other side connected in series with switch 1b to line L2.

FIG. 1A also includes certain indicated circuits which are extensions of circuits shown in FIG. 1B. Thus the closing circuit 68 for the solenoid 64 is shown connected to the contact 1 of switch 2a and to line L2. Also the opening circuit 69 for solenoid 65 is shown with one connection to contact 2 of switch 2a, and another connection to line L2. With this arrangement, when switch 2a is closed on contact 1, current is supplied to the circuit 68 to activate the closing solenoid valve 64. When switch 2a closes on contact 2, current is supplied to circuit 69, whereby solenoid valve 65 is activated. The closing and opening circuits 54 and 55 are likewise shown. Circuit 54 has a connection to contact 1 of switch 3b, and to the line L2, and circuit 55 has a connection to contact 2 of switch 3b, and to line L2. Thus when switch 3b is closed on contact 1, current is supplied to circuit 54 to energize closing solenoid valve 52. Likewise, when switch 3b closes on contact 2, circuit 55 is energized to activate the opening solenoid valve 53. Additional circuits 98, 99, 100, 101 and 102 are shown on the right hand side of FIG. 1A. As will be presently explained, circuit 98 operates a so-called bleed valve for bleeding down the cavity between the two valves V1 and V2. This circuit is shown connected to the contact 2 of switch 3a and to line L2. Circluits 99 and 100 energize a double acting solenoid for operating a sphere detent pin to be presently described. Circuit 99 connects to contact 1 of switch 4a, and to line L2. When circuit 99 is energized it return the detent pin to normal projected position. Circuit 100 also connects to the sphere detent device. and when energized it serves to retract the detent pin. Circuit 100 connects to contact 2 of switch 4a and to line L2. Circuit 101 connects to a pressure sensitive device which is likewise connected to the cavity between the valves V1 and V2. It connects to line L1 in series with indicator lamp 42, and to line L2. Therefore when this circuit is closed the indicator lamp 42 is illuminated. Circuit 102 connects with a solenoid valve which serves to control a bypass about valve V1, as will be presently explained. It has connection with contact 2 of switch 2b, and another connection to line L2.

Referring now to FIG. 3, which shows a portion of the interchange means, the connecting means 21 between the valves V1 and V2, which forms a cavity within which the spheres may be lodged, is shown in communication with leak detecting means 106. This means can consist of a solenoid operated vent valve 107 and a pressure responsive device 108, both being connected to the interior of the connecting means 21 by piping 109. When the vent valve 107 is operated by energizing its circuit 98, it vents pressure from the connecting means 21 until the pressure is reduced to atmospheric. After closing of the vent valve 107, if leakage should occur past the valve V1, pressure again builds up in the connecting means 21. The pressure sensitive device 108 can consist of a cylinder and spring urged pistion. Electrical contacts are arranged whereby when the piston is moved a predetermined distance due to applied pressure, the contacts are closed.

In place of a solenoid operated vent valve 107, this valve may be provided with a pneumatic operator of the cylinder-piston type, with the air supply to the operator being controlled by a solenoid valve.

Bypass piping 111 is provided about the valve V1. This piping includes the solenoid operated valve 112, whereby the valve is opened when current is applied to the circuit 102 to permit liquid to bypass about the valve V1. At a certain point in the automatic cycle it is desirable to bypass valve V1 while it is closed, whereby pressure in the cavity of the connecting means 21 is somewhat equalized with the upstream pressure before the valve is opened. This valve may likewise be pneumatically operated in the same manner as described for vent valve 107.

Device 113 forms a sphere detaining device on the downstream side of the valve V2 and includes a retractable detent pin 114. When solenoid winding 117 of this device is energized, the pin 114 is retracted to permit the ball to proceed. When winding 116 is energized, the pin 114 is returned to its initial position. Circuits 99 and 100 (previously mentioned) connect with the solenoids 116 and 117 to effect their operation.

In place of solenoid operation of detent pin 117 it may be desirable to employ hydraulic operation. Thus the pin may be connected to the piston of a double acting operator of the cylinder-piston type, with application of liquid under pressure controlled by solenoid operated control valve means.

FIG. 3 illustrates more clearly the manner in which the leak detecting means functions in connection with the indicator lamp 42. The contacts 119 constitute a part of the pressure sensitive device 108. They are connected respectively to line L2 and to line L1 in series with lamp 42. Thus when the contacts 119 are closed due to pressure build-up in the connecting means 21, the lamp 42 is illuminated to indicate a leakage in the valve V1.

Operation of the system described above, and the steps of the present method are as follows: Before a cycle of operation is commenced, all of the switches are in the positions illustrated in FIGS. 1A and 1B. Both of the valves V1 and V2 are closed, and the sphere is within the cavity formed by the connecting means 21. The sphere detent pin 114 is in the position schown in FIG. 2. Both of the timing motors 87 and 88 are de-energized. It is assumed that hydraulic and pneumatic pressures have been built up in the accumulators 48 and 58. To start a cycle of operation, the operator closes the start switch 41. This energizes the timer motor 87, and immediately thereafter the contacts of switch 1a are closed. This serves to energize the winding of relay 92, thus closing the contacts of this relav to establish a holding circuit. Immediately thereafter, the continued operation of timing motor 87 causes switch 2a to open its contact 1, and to close contact 2. This de-energizes the circuit 68 for the closing solenoid 64 and valve V2, and by energizing circuit 69 the solenoid 65 is operated to condition the four-way valve 62 to open valve V2. The sphere now passes through the valve V2 and comes to rest upon the detent pin 114. After a predetermined time interval which is ample for movement of the sphere to the detent pin 114, continued operation of motor 87 causes switch 2a to again close its contact 1, with the result that the opening solenoid 65 is de-energized and the closing solenoid 64 again energized. Thus valve V2 is again closed. After a lapse of a sufficient predetermined period of time to ensure complete closing of valve V2, timer motor 87 causes switch 3a to close on contact 2. This energizes circuit 98, which causes the solenoid vent valve 107 to be energized. Thus by bleeding fluid from the cavity of the connecting means 21, the pressure is reduced to atmospheric. The electrical contacts 119 for the pressure sensitive device 108 are thus opened, with the result that the lamp 42 is extinguished. After a predetermined time interval adequate for venting the connecting means 21 to atmospheric pressure, continued operation of motor 87 causes switch 3a to open contact 2, and close on contact 1. This causes the vent valve 107 to be de-energized and to close. If the valve V1 should be leaking, pressure builds up in the connecting means 21, with the result that the pressure sensitive device 107 closes its contacts 119 to illuminate the lamp 42. By way of example, the pressure sensitive device 108 may be set to close its contacts at a pressure of 10 p.s.i. The timer provides an interval of the order of 15 seconds before the next operation of the cycle, during which time the illumination of lamp 42 will show the operator that a leak is occurring and that the results of the run will not be accurate.

Continued driving of the motor 87 operates the switch 4a, whereby it opens contact 1 and closes on contact 2. This energizes circuit 100 to the winding 117 of the detent device 113, with the result that the pin 114 is retracted to permit the sphere to move down the interchange. After a predetermined interval of time adequate for the sphere to pass the pin, switch 4a is again operated to open contact 2 and close contact 1. This causes the circuit 99 to the solenoid 116 to be energized, thus causing the pin 114 to be restored to its original position shown in FIG. 2. The interval of time between retraction and restoration of pin 114 should be such that this operation is completed before the sphere engages the detector 36. When the sphere reaches the detector 36, a contact is closed which gates the meter counter. The sphere now continues through the metering loop 19, and eventually engages the detector 38, thus gating the counter off. When the sphere engages the detector 38, the switch 95 is closed, thus energizing the timing motor 88. At the same time the winding of relay 96 is energized, whereby the contacts of this relay establish a holding circuit across switch 95. The timer motor causes operation of switch 2b to close contact 2, thus energizing the circuit 102 of the solenoid bypass valve 112 (FIG. 2). This opens the bypass 111 about the valve V1, with the result that line pressure from the upstream side is permitted to pass into the cavity of the connecting means 21, thus eliminating or substantially reducing the differential pressure upon the valve V1. After a predetermined interval sufficient to repressure the connecting means 21, the contact 2 of switch 2b is opened, thus de-energizing the bypass solenoid, and the switch 3b closes on contact 2, thus energizing the circuit 55 to the open solenoid 53 of the valve V1. As a result, the valve V1 is power operated to its open position, and it remains in this condition for a sufficient period of time for the sphere to move through the same and into the cavity of the connecting means 21. After a predetermined interval of time sufficient for this operation, switch 3b is operated to open contact 2 and to close contact 1. Thus the opening circuit 55 is de-energized, and the closing circuit 54 energized to cause operation of the closing solenoid 52 of valve V1. After a sufficient lapse of time to complete this operation, switch 4b is operated to close contact 2, whereby the winding of the holding relay 93 is energized to cause its contacts to close to energize ready lamp 43. This also establishes a holding circuit through the back contact of relay 92. This holding circuit remains until relay 92 is operated at the commencement of a cycle to close on contact 2. At this time, relay 93 is de-energized and lamp 43 is extinguished.

It will be evident that the foregoing method and system provide a completely automated cycle. This cycle is commenced by the simple closing of a single switch, and it is terminated automatically after the sphere has been repositioned within the cavity of the connecting means 21. Before the sphere has been launched, the operator is apprised of leakage past the valve V1, which would seriously affect the desired accuracy.

In the foregoing, reference has been made in particular to possible leakage about the valve V1. However, with the leak detecting means described and illustrated particularly in FIG. 2, leakage past either one or both of the valves V1 and V2 is detected. In this connection it may be pointed out that when the connecting means 21 is vented to atmosphere, line pressure is applied to the upstream side of valve V1, and also some back pressure may be applied to the valve V1. The venting of connecting means 21 and securing an indication of any immediate build-up of pressure serves to detect leakage past either one of the two valves. If one should desire to ignore possible leakage about the valve V2, the system can be changed by connecting the leak detecting means 106 with the closed body space of the valve V1 whereby it detects only leakage past the upstream sealing means of this valve. In such event, the bypass 111 can be omitted, or it can be connected into the same body space, whereby after a leak detecting operation line pressure is readmitted to the closed body space of the valve V1.

It will also be evident that the invention is not confined to the use of hydraulic power operators. In some instances it may be desirable to use other types of power operating devices, such as electrical operators, with electrical circuitry for the necessary opening and closing operations.

Various parts of the system can be located to suit operating conditions. For example the start switch 41, together with lamps 42 and 43 can be placed at a station remote from the system parts shown in FIG. 4. The hydraulic and pneumatic parts, including the four-way valves and associated control devices may likewise be installed at a common station together with the hydraulic pump 47 and compressor 61 and their driving motors and accumulators.

What is claimed is:

1. In a meter proving system for metering liquid flow, a metering pipe of predetermined length having inlet and discharge ends and adapted to receive a flow propelled sphere, interchange means forming a passage connecting between the inlet and discharge ends of the metering pipe and serving to transfer a sphere that has been discharged from the metering pipe back into the inlet thereof, said interchange means comprising first and second valves and means forming a sphere accommodating cavity serving to serially connect said valves, separately controllable power operating means for each of the valves, a retractable sphere detent means located between the second valve and the inlet end of the metering pipe, a vent valve connected to said cavity and adapted when actuated to vent the cavity to atmospheric pressure, pressure sensitive means connected to the cavity and serving to indicate a build-up of pressure therein following venting, a sphere detecting device located near the discharge end of the metering pipe, and means for effecting controlled operation of said valve operating means, said detent means, said vent valve and said pressure sensitive means whereby an automatic cycle of operation is provided in which starting with the sphere located in the cavity between the two valves and the two valves closed, the second valve is first opened whereby the sphere is caused to move to a position against the detent device, after which the second valve is closed, the vent valve is then opened to vent said cavity to atmosphere for a predetermined period of time after such venting, the pressure sensitive means connected with the cavity after such venting to indicate any build-up of pressure, the detent means is then retracted whereby the sphere is caused to pass into the inlet end of the metering pipe, the sphere permitted to continue through the metering pipe to effect operation of the sphere detecting means and the first valve is then opened in response to actuation of the sphere detecting device whereby the sphere passes through the first valve back to the cavity.

2. A system as in claim 1 together with a bypass between the upstream side of the first valve and the cavity of the connecting means and a valve for controlling said bypass, said bypass valve being automatically operated to open the same before opening of the first valve thereby equalizing pressure across the first valve before opening of the same.

3. A system as in claim 2 in which said last named means includes electrical circuitry together with two timing means included therein, one of said timing means having sequentially operated switches for effecting that part of the automatic cycle ending with movement of the sphere through the metering pipe, the second timing means having sequentially operated switches serving to control the operations of the automatic cycle commencing with opening of the bypass valve responsive to operation of the sphere detector and ending with closing of the first valve.

4. A system as in claim 1 in which said last named means includes electrical circuitry together with timing means and electrical switch contacts sequentially operated by said timing means.

References Cited

UNITED STATES PATENTS

| | | | |
|---|---|---|---|
| 2,635,626 | 4/1953 | Meynig | 137—462 XR |
| 2,744,537 | 5/1956 | Clark | 137—462 |
| 2,948,144 | 8/1960 | Applequist | 73—3 |
| 3,135,278 | 6/1964 | Foord et al. | 137—599 XR |
| 3,199,527 | 8/1965 | Coley et al. | 73—3 XR |
| 3,252,618 | 5/1966 | Anderson et al. | 73—3 XR |
| 3,295,357 | 1/1967 | Halpine et al. | 73—3 |
| 3,387,483 | 6/1968 | Van Arsdale | 73—3 |
| 3,423,988 | 1/1969 | Grove et al. | 73—3 |

LOUIS R. PRINCE, Primary Examiner

H. C. POST III, Assistant Examiner

U.S. Cl. X.R.

73—40.5